(No Model.)
G. W. GRAFFIN.
VALVE.
No. 546,922. Patented Sept. 24, 1895.
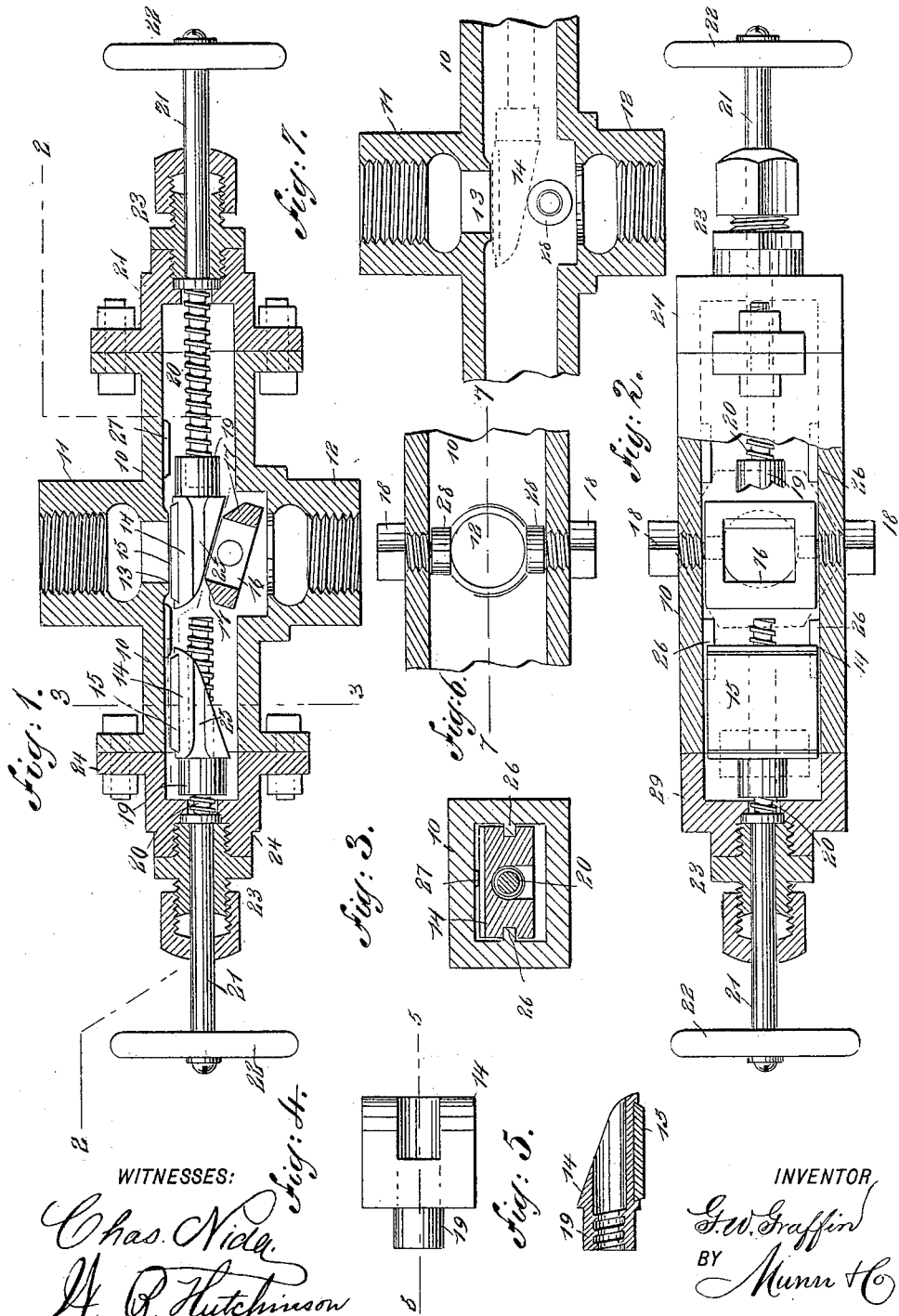
WITNESSES:
Chas. Nide.
H. B. Hutchinson
INVENTOR
G. W. Graffin
BY Munn & Co
ATTORNEYS.

UNITED STATES PATENT OFFICE.

GEORGE W. GRAFFIN, OF ALLENTOWN, PENNSYLVANIA.

VALVE.

SPECIFICATION forming part of Letters Patent No. 546,922, dated September 24, 1895.

Application filed October 8, 1894. Serial No. 525,287. (No model.)

*To all whom it may concern:*

Be it known that I, GEORGE W. GRAFFIN, of Allentown, in the county of Lehigh and State of Pennsylvania, have invented a new and Improved Valve, of which the following is a full, clear, and exact description.

My invention relates to improvements in valves, and particularly to steam-valves, although the valves may be used for other purposes.

The object of my invention is to produce a simple, practical, and positively-working valve which is adapted to make a steam-tight closure, which may be very easily taken apart for repairs, and which has a double-valve arrangement, either of which is adapted for use in the ordinary way to open or close the valve, and thus one valve may be removed for repairs and the other kept in use, so that no great inconvenience is experienced in keeping the valve in working order.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a longitudinal section of my improved valve, showing one of the valves in position to close the inlet of the valve-casing. Fig. 2 is a broken sectional plan on the line 2 2 of Fig. 1. Fig. 3 is a cross-section on the line 3 3 of Fig. 1. Fig. 4 is a detail inverted plan of the valve proper. Fig. 5 is a longitudinal section on the line 5 5 of Fig. 4. Fig. 6 is a broken sectional plan showing a modified arrangement of the abutments or guides for the valves proper, and Fig. 7 is a longitudinal section on the line 7 7 of Fig. 6.

The valve is provided with an elongated casing 10, which has on opposite sides suitable inlets and outlets 11 and 12, these being of the ordinary kind, so as to make connection with steam or other pipes, and at the inner end of the inlet 11 is a seat 13, against which one of the valves 14 is adapted to close. These valves are arranged in opposite end portions of the casing 10 and are adapted to move back and forth to open and close the valve-casing, and the valves and their moving mechanism are exactly similar, so that it is necessary to describe but one.

The valve 14 is of wedge shape, being flat on the side next the seat 13, and on this flat side is held a suitable packing 15, which may be of rubber, leather, metal, or anything suitable for the purpose, and the packing is preferably dovetailed into the valve, as shown best in Fig. 5. The opposite side of the valve is inclined, as shown clearly in Figs. 1 and 5, so that the valve may readily enter between the seat 13 and an abutment-block which is arranged transversely in the casing 10, parallel with the seat, and when the valve is wedged between the abutment or guide block and the seat the valve-casing is tightly closed. To enable this wedging action to be easily accomplished, the guide or abutment block 16 is provided with inclined sides 17, and it is pivoted on bolts 18, which are held transversely in the casing 10, and thus by means of the inclined sides and its pivot the abutment-block readily conforms to the shape of the wedge or valve and the latter is forced firmly against its seat.

The valve has at its butt-end a nut 19, which fits the screw 20 of the valve-stem 21, which valve-stem is provided with the ordinary hand-wheel 22 and turns in a common stuffing-box 23, the latter being secured to a bonnet 24, which is fastened to the end of the casing 10.

By reference to Fig. 1 it will be seen that the arrangement of the bonnets, stuffing-boxes, and valve-stems is exactly similar at each end of the valve, and hence if it is desired to repair one of the valves 14 the other one may be moved into a closed position, the valve to be repaired removed, the valve-casing closed, and the single valve left in the casing performs the necessary work until the other valve can be restored.

In the drawings I have shown the valve-stems and the end portions of the casing 10 as arranged exactly opposite each other; but it will of course be understood that for use in corners and certain other places these parts may be held at different angles to each other without affecting the principle of the invention.

To enable each valve 14 to be accurately and nicely moved to its seat, it is provided with suitable guides, and to this end each valve is longitudinally slotted, as shown at 25, the slots being made in opposite sides of the valve, and the slots receive the guide-ribs 26, which project from the inner sides of the casing 10, as shown clearly in Figs. 2 and 3.

To prevent any possible catching of the valves on the seat 13, guide-ribs 27 with rounded ends are placed opposite the seat-faces of the valves and on opposite sides of the seat 13, as shown clearly in Fig. 1, and these guide-ribs, engaging the valves, press them inward sufficiently to enable their points to clear the seat 13.

It is not necessary to use the abutment-block 16 to guide the valves, as many equivalent devices may be used with substantially the same effect. One of these devices is illustrated in Figs. 6 and 7, which show the bolts 18 provided at their inner ends with guide-rollers 28, which by engaging the valves, as shown in Fig. 7, force them to their seat. It will be seen, too, that even a cross-bar arranged in the path of the inclined sides of the valves would answer the purpose, and that many abutments might be used without affecting the principle of the invention, although the abutment-block shown in Fig. 1 is preferably employed.

Having thus described my invention, I claim as new and desire to secure by Letters Patent—

1. A valve comprising a casing having an inlet and an outlet and provided with a seat at said inlet, two valves movably mounted in the casing and adapted to be seated on the valve seat, when moved in different directions and an abutment movably secured in the casing opposite the valve seat and adapted to be engaged by each valve when moved, whereby the valves are pressed down to said seat, substantially as set forth.

2. A valve comprising a casing having oppositely arranged inlet and outlet apertures and provided with a seat at said inlet, a valve mounted to slide in the casing and adapted to be seated on said seat, and an abutment pivoted in the casing behind said valve seat and having a perforation adapted to afford direct communication between the inlet and outlet when the valve is off its seat, said abutment being adapted to be engaged by the rear face of the valve when moved whereby said valve is pressed against its seat, substantially as set forth.

3. A valve comprising a casing having an inlet and an outlet and provided with a seat at said inlet, two valves slidingly mounted in the casing and each adapted to be seated on the valve seat, and a tilting abutment mounted in the casing and adapted to be engaged and moved by the respective valves when the same are moved whereby the valve moved is pressed against its seat, substantially as set forth.

GEORGE W. GRAFFIN.

Witnesses:
H. E. GRAFFIN,
ARTHUR I. NEBERROTH.